United States Patent [19]

Kitamura

[11] Patent Number: 5,457,806
[45] Date of Patent: Oct. 10, 1995

[54] COMPUTER SYSTEM INCLUDING LAN ANALYZER AND METHOD OF ANALYZING COMMUNICATION PROCEDURE

[75] Inventor: Asako Kitamura, Oomiya, Japan

[73] Assignee: Kabushiki Kaisha Toshiba, Kawasaki, Japan

[21] Appl. No.: 158,314

[22] Filed: Nov. 29, 1993

[30] Foreign Application Priority Data

Dec. 11, 1992 [JP] Japan ..................... 4-331340

[51] Int. Cl.$^6$ ..................... G06F 13/14
[52] U.S. Cl. ..................... 395/800; 364/DIG. 1; 364/DIG. 2; 364/222.2; 364/229; 364/240; 364/240.8; 364/242.94; 364/242.5; 364/919; 364/940; 371/32
[58] Field of Search ............. 395/800; 364/DIG. 1, 364/DIG. 2, 222.2, 229, 240, 240.8, 242.94, 242.5, 919, 940; 371/19, 15.1, 32

[56] References Cited

U.S. PATENT DOCUMENTS

| | | | |
|---|---|---|---|
| 4,665,520 | 5/1987 | Strom et al. | 371/7 |
| 5,331,647 | 7/1994 | Seki et al. | 371/53 |
| 5,377,188 | 12/1994 | Seki | 370/85.1 |

OTHER PUBLICATIONS

Richard H. Carver, et al., "Replay and Testing for Concurrent Programs", IEEE Software, Mar., 1991, pp. 66–74.

*Primary Examiner*—Eric Coleman
*Assistant Examiner*—Valerie Darbe
*Attorney, Agent, or Firm*—Oblon, Spivak, McClelland, Maier & Neustadt

[57] ABSTRACT

A LAN analyzer is applied to a computer system in which a plurality of computers are connected to a transmission line of a LAN, and which has a first operation mode wherein the plurality of computers execute a piece of information processing, while using a message passing through the transmission line and a second operation mode wherein the same operation as in the first operation mode is replayed. The LAN analyzer includes a message reading section for reading a message, including at least information on a sender computer and a destination computer, which has been output from the plurality of computers to the transmission line, in the first operation mode, a communication history storing section for storing messages read by the message reading section and message generation time information on the time at which the messages are generated, in a time series manner, in the first operation mode, and message reproducing section for reading the messages stored in the communication history storing section in the sequence in which the messages were stored, and sequentially outputting the messages on the basis of the message generation time information, in the second operation mode. Each of the plurality of computers includes a replay device for replaying the information processing in accordance with an output of the message reproducing section in the second operation mode, and a message output prohibiting device for prohibiting a message from being output to the transmission line.

7 Claims, 6 Drawing Sheets

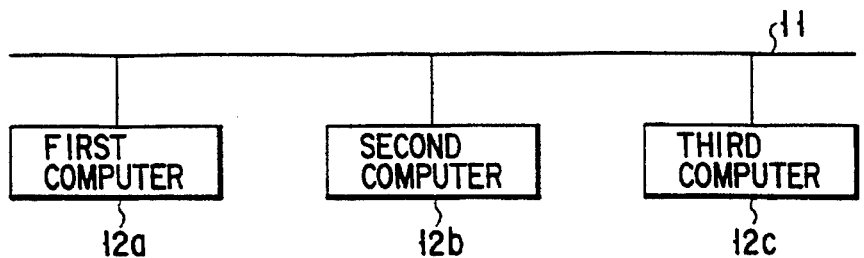
F I G. 1
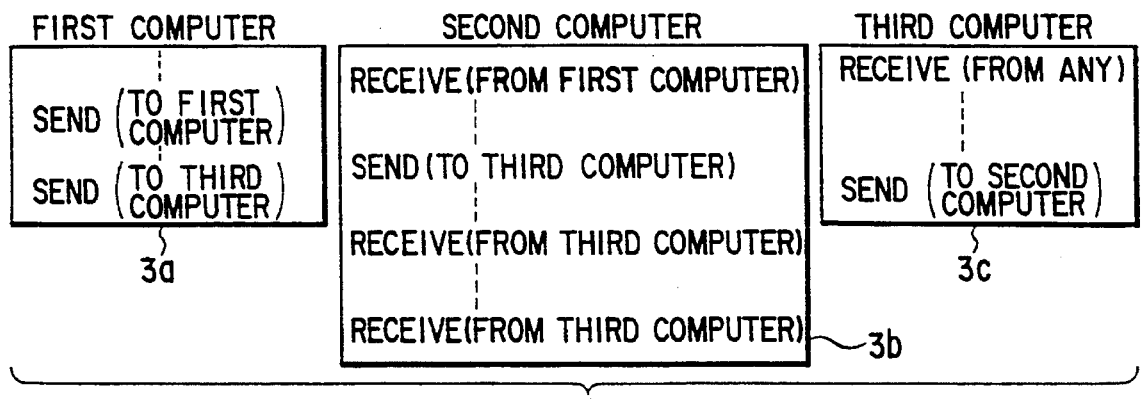
F I G. 2
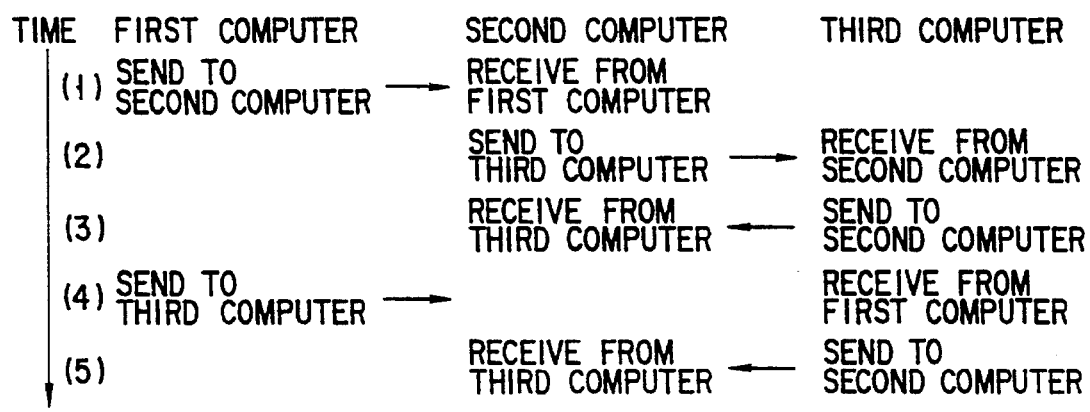
F I G. 3

| | TIME ELAPSED SINCE PREVIOUS MESSAGE Δt (msec) | MESSAGE |
|---|---|---|
| 1 | 800 | (1) MESSAGE FROM FIRST COMPUTER TO SECOND COMPUTER |
| 2 | 700 | (2) MESSAGE FROM SECOND COMPUTER TO THIRD COMPUTER |
| 3 | 400 | (3) MESSAGE FROM THIRD COMPUTER TO SECOND COMPUTER |
| | 100 | (4) MESSAGE FROM FIRST COMPUTER TO THIRD COMPUTER |
| | 400 | (5) MESSAGE FROM THIRD COMPUTER TO SECOND COMPUTER |
| N | | |
| | | |

COMPUTER SYSTEM INCLUDING LAN ANALYZER AND METHOD OF ANALYZING COMMUNICATION PROCEDURE

BACKGROUND OF THE INVENTION

1. Field of the Invention

The present invention relates to a LAN analyzer and a method of analyzing a communication procedure, applied to a computer system in which a plurality of computers connected to a transmission line of a LAN (Local Area Network) execute information processing respectively allocated to the computers, while using a message passing through the transmission line, and more particularly to a LAN analyzer and a method of analyzing a communication procedure, in which, when an operational error occurs, the information processing for the same information is reproduced and the operation program is debugged.

2. Description of the Related Art

A distributed computer system has been developed, in which a plurality of computers execute a single piece of complicated information processing in a shared manner.

FIG. 1 is a block diagram showing a distributed computer system in which three computers are connected to the transmission line of a LAN. FIG. 2 shows an example of programs respectively set in the three computers shown in FIG. 1.

Referring to FIGS. 1 and 2, first to third computers 12a to 12c are connected to a transmission line 11. Programs 3a to 3c, for executing jobs allocated to the first to third computers 12a to 12c, are stored in memories (not shown) of the first to third computers 12a to 12c, respectively. Since a single piece of information processing is divided into individual jobs and allocated to the first to third computers 12a to 12c, the jobs allocated to the computers 12a to 12c are associated with one another. Therefore, a single piece of information processing is executed by the entire computer system, while various messages are being exchanged among the computers 12a to 12c.

To execute the information processing, each of the programs 12a to 12c, stored in the first to third computers, includes a send command to transmit a message from itself to another computer (e.g., SEND to N-th Computer, where N is the number of a destination computer).

An operation of the above-described computer system will be described with reference to FIG. 3, which shows sequence of messages output to the transmission line.

When the above computer system is activated to start, the first to third computers 12a to 12c transmit, to the transmission line 11, messages including information on a destination computer and a sender computer, in accordance with the proceeding of the programs 3a to 3c. Each of the first to third computers 12a to 12c analyzes messages on the transmission line 11 and receives a message which is addressed to itself. Accordingly, messages are output to the transmission line in a sequence of (1)→(5) as shown in FIG. 3.

In the information processing as described above, whether the programs (3a to 3c shown in FIG. 2) incorporated in the computers are correctly executed is confirmed prior to actual execution of the programs. If an error is detected, the programs should be debugged.

In a debugging process, in general, a program is reactivated to repeat an error, and then comprehend and analyze the error. However, in a computer system in which the jobs in the process are allocated to a plurality of computers, even when the process is repeated to cause the same error, it is difficult to repeat the same process, since an execution path could have been changed due to variation in the computer loads and the network load.

For example, assuming that message passing is executed among the first to third computers 12a to 12c in the sequence of (1)→(5) of FIG. 3, if the same information processing is replayed, the steps (2) and (4) may be exchanged, i.e., the sequence may be changed to (1)→(4)→(5)→(2)→(3) due to variation in the computer loads and the network load. In this case, a final result is the data obtained by the step (3), which is different from the result obtained by the processing in the sequence of (1)→(5).

When one computer executes a single piece of information processing, the same result is always obtained from the same input (deterministic operation). In contrast, when a plurality of computers execute one piece of information processing, while using message passing among the computers (parallel-programs), the same result is not always obtained from the same input (nondeterministic operation), since the order of the messages received by the computers may be subject to change, as described above.

Therefore, when a plurality of computers execute one piece of information processing, even if the processing is to be replayed to debug the program, the same processing cannot necessarily be executed in the replay.

To overcome this drawback, various methods are employed to replay a program so that it will repeat an error in a debugging process. For example, a program for storing a communication history necessary for replaying the program (a function of storing a communication history when a program is first executed to replay the program later and a function of managing the order of communication received when the program is replayed) is linked to user programs, or a module for storing a communication history is incorporated in a computer.

However, a system incorporating a program which includes a step of storing a communication history also has the following drawbacks.

In the method of linking a program for storing a communication history to user programs, a function of recording a communication history and a function of managing a replay process are added before and/or after a command to transmit or receive a message in the program. Thus, according to this method, since the user's original program is partially changed and a module having a function of storing a communication history is linked to the program, the computer load, required for executing the program, is increased.

Therefore, the load caused by the additional program for storing the communication history is added to the operation load of the computer and affects normal processing. For this reason, the sequence of the recorded processing in which a communication history is recorded to replay the program does not coincide with the sequence of the normal execution in which the communication history is not recorded. In other words, an additional load is applied to the computer system in the communication history recorded by this method. Therefore, even if the program is replayed on the basis of the communication history, the message exchange in the normal execution cannot be repeated in the accurately same order.

As has been described above, according to the conventional LAN analyzer and the conventional method of analyzing a communication procedure, the same error cannot always be repeated in the replay and a program, therefore, cannot be debugged satisfactorily.

SUMMARY OF THE INVENTION

An object of the present invention is to provide a LAN analyzer and a method of analyzing a communication procedure, by which messages can be collected or reproduced without applying a process load to computers or the network, and a message can be reproduced accurately in accordance with its communication history in a replay process, thereby greatly improving the operation efficiency in a debugging process.

According to a first aspect of the present invention, there is provided a LAN analyzer applied to a computer system in which a plurality of computers are connected to a transmission line of a LAN, and which has a first operation mode wherein the plurality of computers execute a piece of information processing, while using a message passing through the transmission line and a second operation mode wherein the same operation as in the first operation mode is replayed, the LAN analyzer comprising: message reading means for reading a message, including information on a computer, which has been output from the plurality of computers to the transmission line, in the first operation mode; communication history storing means for storing messages read by the message reading means and message generation time information on the time at which the messages are generated, in a time series manner, in the first operation mode; and message reproducing means for reading the messages stored in the communication history storing means in the sequence in which the messages were stored, and sequentially outputting the messages on the basis of the message generation time information, in the second operation mode, wherein each of the plurality of computers comprises: replay means for replaying the information processing in accordance with an output of the message reproducing means in the second operation mode; and message output prohibiting means for prohibiting a message from being output to the transmission line.

There is also provided a method of analyzing a communication procedure applied to a computer system in which a plurality of computers are connected to a transmission line of a LAN, and which has a first operation mode wherein the plurality of computers execute a piece of information processing, while using a message passing through the transmission line and a second operation mode wherein the same operation as in the first operation mode is replayed, the method comprising: a first step of reading messages output from the plurality of computers to the transmission line, each of the messages including information on a computer, in the first operation mode; a second step of storing the messages read in the first step together with message generation time information on the time at which a message is generated, in a time series manner; a third step of sequentially outputting the messages stored in the second step based on the message generation time information, in the second operation mode; and a fourth step of replaying the information processing in accordance with the third step and prohibiting the messages from being output to the transmission line.

According to the present invention, since a program for storing a communication history is not linked to user programs, a message output to a transmission line and information on the time at which the message is generated (generation timing) are stored in a memory without an influence on the computers constituting the computer system and the network.

Further, according to the present invention, for example, in a debugging process, when a process is replayed, the messages stored in a time series manner are sequentially output to the transmission line at intervals as stored in the memory. The computers replay the process in accordance with a replay command in the second operation mode. At this time, although the computers fetch the messages addressed thereto from the transmission line, they do not output the messages, which should be transmitted to another computer, to the transmission line. In other words, in the second operation mode, a message, which should be transmitted from a computer to another computer, is output from, for example, the LAN analyzer to the transmission line at the same timing as in the previous processing. Thus, as the computers do not output messages, they are prevented from outputting the same messages repeatedly.

As described above, according to the present invention, since the previous processing is replayed accurately, replay of an error, which is indispensable for a debugging process of the computer system, is ensured, so that the error can be comprehended and analyzed.

According to a second aspect of the present invention, there is provided a plurality of LAN analyzers applied to a computer system in which a plurality of computers are connected to a transmission line of a LAN, and which has a first operation mode wherein the plurality of computers execute a piece of information processing, while using a message passing through the transmission line and a second operation mode wherein the same operation as in the first operation mode is replayed, the LAN analyzers provided between the transmission line and the plurality of computers, respectively, each of the LAN analyzers comprising: message reading means for reading a message, including information on a computer, which has been output from the plurality of computers to the transmission line, in the first operation mode; communication history storing means for storing messages read by the message reading means and message generation time information on the time at which the messages are generated, in a time series manner, in the first operation mode; message reproducing means for reading the messages stored in the communication history storing means in the sequence in which the messages were stored, and sequentially outputting the messages on the basis of the message generation time information, in the second operation mode; and message abandoning means for abandoning a message output from the computer corresponding to the LAN analyzer, in the second operation mode, wherein the plurality of computers comprises means for replaying the information processing in the second operation mode.

In this LAN analyzer, messages output from the computers in a replay process in the second operation mode are abandoned by the LAN analyzer. Therefore, the computers need not use a specific program for the replay.

As described above, according to the present invention, messages transmitted to the transmission line are stored in a memory together with information on the time at which the messages are generated, in a time series manner. Thus, since the messages can be collected or reproduced without applying a process load to computers or the network and the message can be reproduced accurately in accordance with the communication history in a replay process, the operation efficiency in a debugging process can be greatly improved.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of present invention in which:

FIG. 1 is a block diagram showing a distributed computer system in which three computers are connected to a transmission line of a LAN;

FIG. 2 is a diagram showing examples of programs set in the the computers shown in FIG. 1;

FIG. 3 is diagram showing an output sequence of messages output the transmission line;

DETAILED DESCRIPTION OF THE PREFERRED EMBODIMENTS

Embodiments of the present invention will be described with reference to the accompanying drawings.

Figure 4:
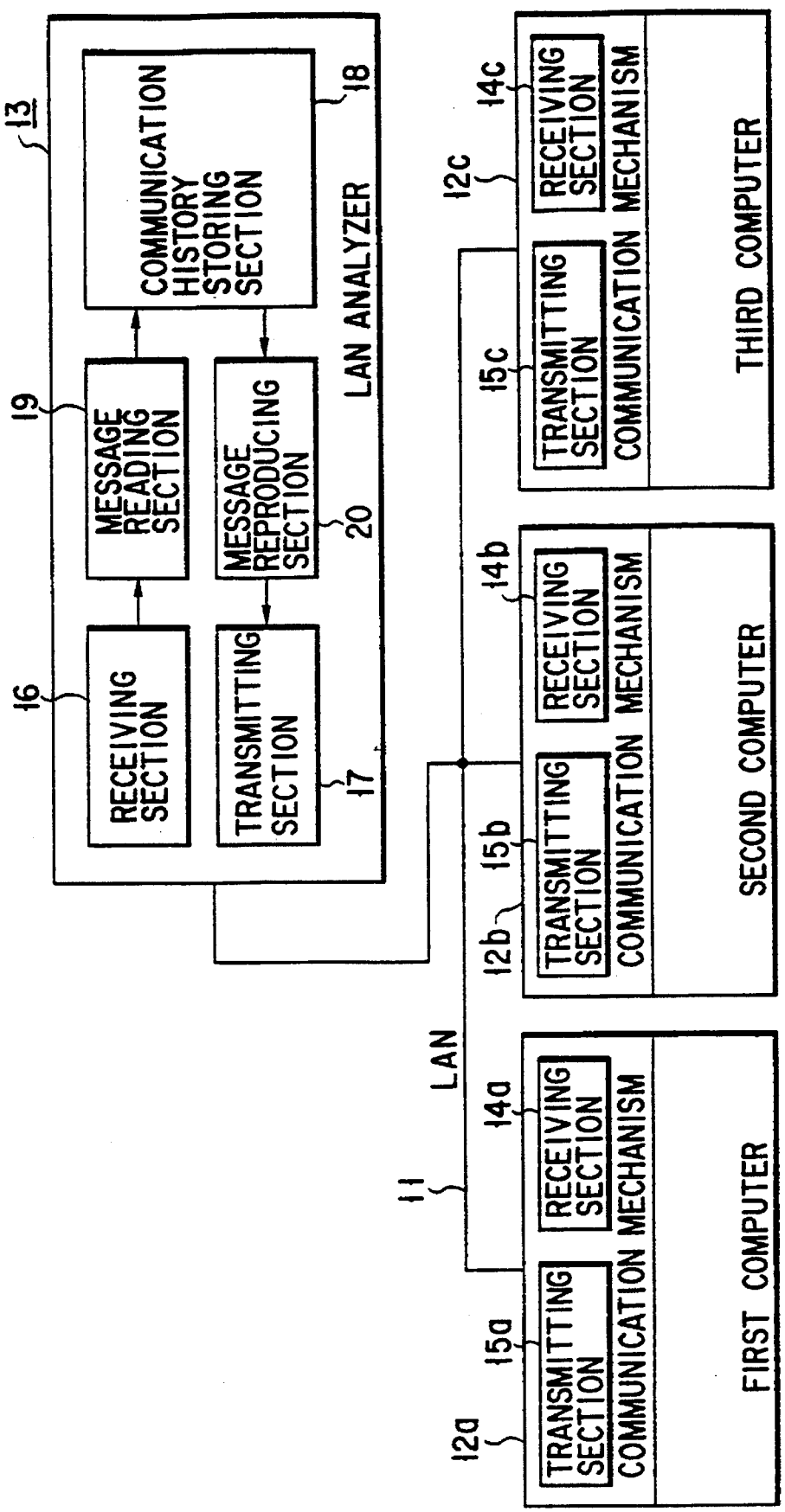
FIG. 4 is a schematic diagram showing a computer system including a LAN analyzer according to a first embodiment the present invention.

FIG. 4 is a schematic diagram showing a LAN analyzer according to a first embodiment of the present invention. In this embodiment, first to third computers 12a to 12c are connected to a transmission line 11 of a LAN, like the conventional system shown in FIG. 1. Although three computers are used in this embodiment for convenience of explanation, the computers are not necessarily three but any number of computers can be used.

The first to third computers 12a to 12c respectively comprise receiving sections 14a to 14c for receiving a message addressed to the computer itself from the transmission line 11 and transmitting sections 15a to 15c for outputting a message, which is to be transmitted to another computer (12a, 12b or 12c), through the transmission line 11.

Storing sections (not shown) of the computers 12a to 12c store job programs 3a to 3c (see FIG. 2) respectively allocated to the computers 12a to 12c, like the conventional computer system shown in FIG. 1. Since the jobs allocated to the computers 12a to 12c are associated with one another, a piece of information processing is executed by the entire computer system, while various messages are being exchanged among the computers 12a to 12c.

As shown in FIG. 4, a LAN analyzer 13 is connected to the transmission line 11 in addition to the first to third computers 12a to 12c.

The LAN analyzer 13 comprises a receiving section 16 for receiving a message output to the transmission line 11; a transmitting section 17 for outputting a message to the transmission line 11; a communication history storing section 18 for storing messages received by the receiving section, in the sequence in which the messages have been received; a message reading section 19 for reading a message to be stored in the communication history storing section 18; and a message reproducing section 20 for reading messages stored in the communication history storing section 18, in the sequence in which the messages have been stored and outputting the read messages to the transmitting section 17.

Figures 5, 6:
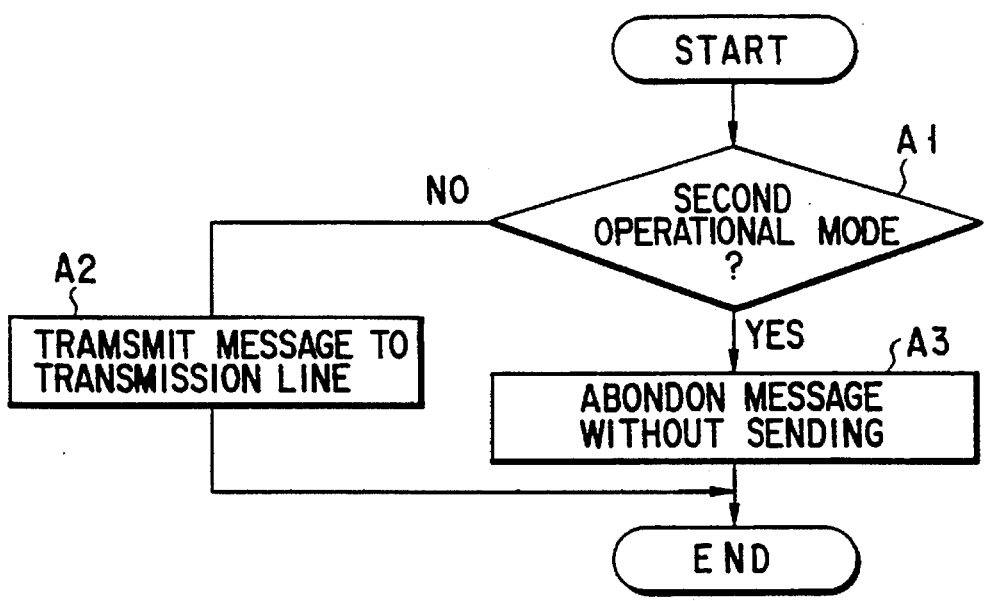
FIG. 5 is a diagram showing a content of a communication history storing section formed in the LAN analyzer.
FIG. 6 is a flowchart showing an operation of the computer in a case where a command in a step of the program stored in the computer is to send a message.

The communication history storing section 18, as shown in FIG. 5, includes a plurality of areas 18a to which area numbers 1, 2, 3, ..., and N are assigned. The areas 18a store messages, which are input through the message reading section 19. Each of the messages includes information on a sender computer and a destination computer, together with a period of time $\Delta t$ elapsed since the time when the immediately previous message was received, in a time series manner.

An operation of the LAN analyzer applied to the above computer system will now be described.

The computer system has an operation mode set by a command to execute a normal information process (hereinafter referred to as a first operation mode) and an operation mode set by a replay command to execute, for example, a debugging process (hereinafter referred to as a second operation mode).

when the power source of the computer system is turned on and the first to third computers 12a to 12c are activated, the computers 12a to 12c start processing of the programs 3a to 3c, shown in FIG. 2, which are stored in their own memory sections (not shown). More specifically, the commands written in the steps of the programs 3a to 3c are sequentially executed.

FIG. 6 is a flowchart showing operations of the first to third computers 12a to 12c, in a case where the command of a step of a program stored in the computer 12a, 12b or 12c is to send a message.

When the proceeding of the program advances to a step of sending a message, the first to third computers 12a to 12c determine whether the operation mode is the second operation mode (step A1). If the operation mode is the first operation mode in step A1, the first to third computers 12a to 12c transmit the message to the transmission line 11 through the transmitting sections 15a to 15c (step A2). If the operation mode is the second operation mode in step A1, the transmitting sections 15a to 15c do not transmit the message to the transmission line 11 (step A3).

As described above, in the second operation mode, the transmitting sections 15a to 15c of the first to third computers 12a to 12c are inhibited from sending the message to the transmission line 11.

In the first operation mode, the LAN analyzer 13 clears all the areas 18a of the communication history storing section 18 and then activates the message reading section 19.

Figure 7:
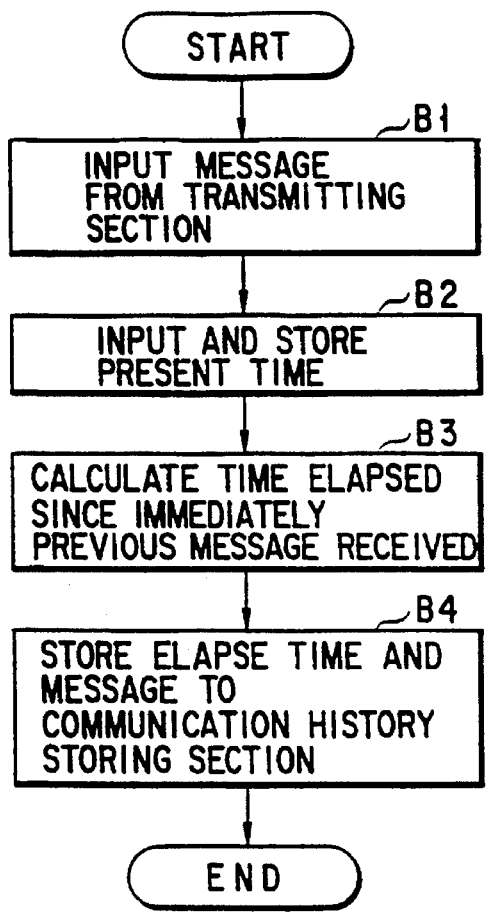
FIG. 7 is a flowchart showing an operation of a message reading section of the first embodiment.

A process of reading a message will be described with reference to FIG. 7. FIG. 7 is a flowchart showing an operation of the message reading section 19 according to the first embodiment. The message reading section 19 executes a message reading process shown in FIG. 7, every time the receiving section 16 receives a message output to the transmission line 11.

The message reading section 19 inputs the message received by the receiving section 16, which includes the information on the destination computer and the sender computer (step B1). The message reading section 19 reads the current time, temporarily stores it in a memory (not shown) (step B2) and calculates the period of time $\Delta t$ elapsed since the time when the immediately previous message was received, which is stored in a reception time memory (not shown) (step B3). At this time, if the received message is the first one, the period of time elapsed since the computer system was activated in the first operation mode is regarded as the elapsed time $\Delta t$.

The message reading section 19 stores the period of elapsed time $\Delta t$ and the presently received message in an area of the smallest number of space areas 18a of the communication history storing section 18 (step B4). The message reading section 19 updates the time stored in the reception time memory to the current time.

Through the above operation, when a series of processes is completed, the messages output to the transmission line 11 are stored in the areas 18a of the communication history storing section 18 together with the elapsed period of time $\Delta t$ in the time series manner.

Figure 8:
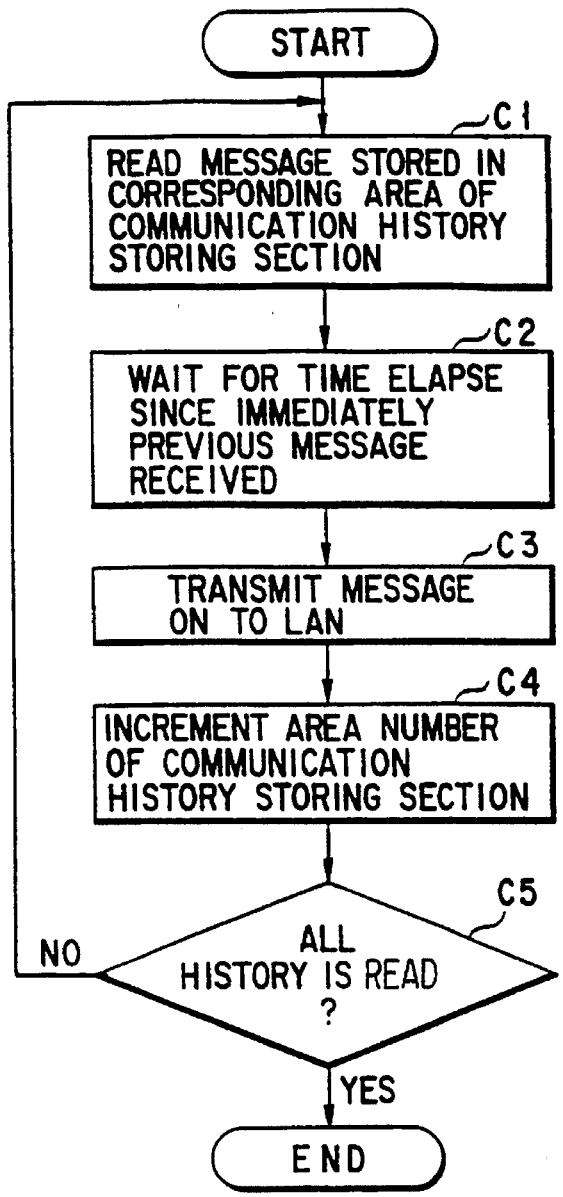
FIG. 8 is a flowchart showing an operation of a message reproducing section of the first embodiment.

A process of reproducing a message will be described with reference to FIG. 8. FIG. 8 is a flowchart showing an operation of the message reproducing section 20 according to the first embodiment. A message reproducing process is executed in the second operation mode to clarify the cause of an error, if any, when a series of processes has been completed.

When the computer system starts operating in the second operation mode, the message reproducing section 20 initializes the area number N to 1. At the same time, the message reproducing section 20 records the current time in a time memory (not shown).

The message reproducing section 20 reads the message and the elapsed period of time $\Delta t$ stored in the area 18a indicated by the area number N (step C1). The message reproducing section 20 waits for the period of time $\Delta t$ elapsed since the time when the message was read from the area of the number (N−1) (step C2). When the period of time $\Delta t$ elapses, the message reproducing section 20 transmits the message read from the area of the number N to the transmission line 11 through the transmitting section 17 (step C3). The time memory is updated to the current time.

As a process of outputting a message to the transmission line 11 is completed through the steps C1 to C3, the area number N is incremented by one (step C4).

If the messages are read from all the areas 18a, the message reproducing process is completed. If not, the procedure returns to the step C1 and the operations of the steps C1 to C4 are repeated (step C5).

As described above, according to the present invention, in the first operation mode, the messages output to the transmission line 11 through the execution of the programs 3a to 3c are stored together with the period of time $\Delta t$ elapsed since the time when the immediately previous message was generated, in the areas 18a of the communication history storing section 18 in the time series manner.

If an error or the like occurs, and the second operation mode is set to cause the same error, the messages stored in the areas 18a of the communication history storing section 18 of the LAN analyzer are sequentially transmitted to the transmission line 11 at the same timing as in the normal information process. In the second operation mode, even if a command to transmit a message is written in the programs 3a to 3c of the first to third computers 12a to 12c, the message is not repeatedly output to the transmission line 11, since the message is supplied from the LAN analyzer 13.

By the above operation, since a normal information process can be completely replayed with the same sequence of the messages at the same intervals, the same error can be repeated, thereby greatly improving the efficiency of a debugging process.

As described above, by virtue of the LAN analyzer of the present invention, in the first operation mode, the first to third computers are not required to output a message to the transmission line 11 or to store a message transmitted from the transmission line 11 in order to replay an operation. The first to third computers 12a to 12c have a function of prohibiting a message from being output in the second operation mode, and need not execute an additional job in the normal information process in the first operation mode.

Thus, according to the present invention, both in the message history storing operation (the first operation mode) and in the message reproducing operation (the second operation mode), a normal processing state can be maintained, and an error detection and debugging operations can be executed in actual operating conditions.

An effect of the first embodiment will be described, referring to a specific example.

Assume that the programs 3a to 3c shown in FIG. 2 are set in the memory sections of the computers 12a to 12c and messages are output to the transmission line 11 in the sequence of (1)→(2)→(3)→(4)→(5) as shown in FIG. 3 in response to a command to execute a normal information process. Further, assume that the message (1) is output 800 ms after the time when the command is input, the message (2) is output 700 ms after the message (1), the message (3) is output 400 ms after the message (2), the message (4) is output 100 ms after the message (3) and the message (5) is output 400 ms after the message (4).

The areas 18a of the communication history storing section 18 store the messages (1) to (5) and the periods of time $\Delta t$ in the time series manner.

When a second operation mode is set, the messages (1) to (5) are sequentially output to the transmission line 11 at intervals of the respective periods of time $\Delta t$, stored in the areas 18a, elapsed since the activation of the second operation mode. Thus, procedures accurately corresponding to the steps in the first operation mode can be replayed.

In the conventional system, in which the sequence of messages and the time intervals are not stored, the messages (2) and (4) may be exchanged depending on the load status of the first to third computers 12a to 12c, i.e., the sequence of (1)→(2)→(3)→(4)→(5) may be changed to (1)→(4)→(5)→(2)→(3). In this case, the final result is the data received with the message (3), and the same error cannot necessarily be repeated.

Figure 9:
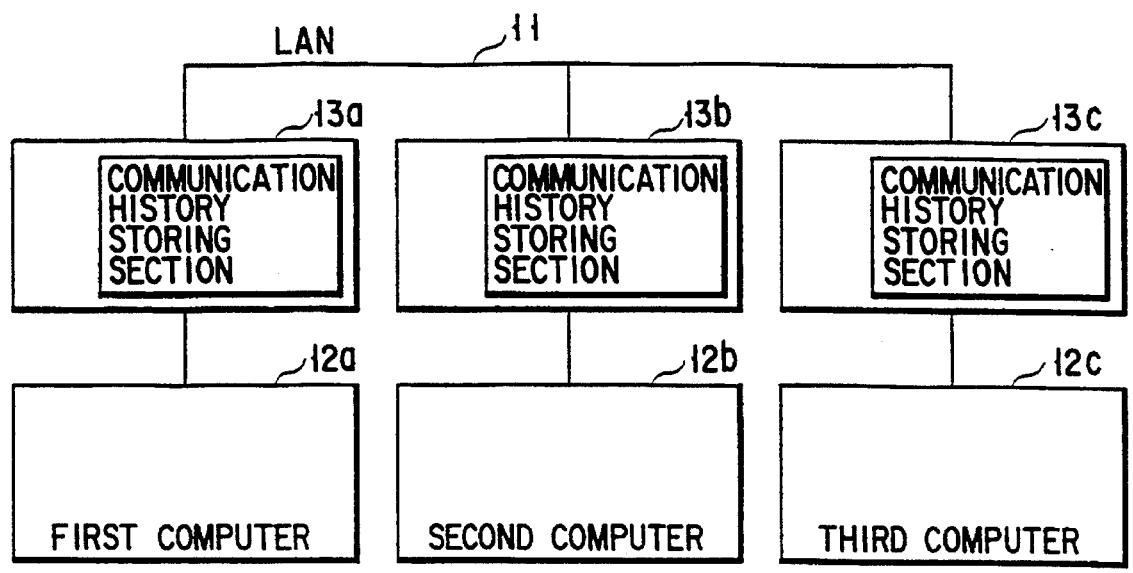
FIG. 9 is a schematic diagram showing a computer system including a LAN analyzer according to a second embodiment of the present invention.

FIG. 9 is a schematic diagram showing a computer system including a LAN analyzer according to a second embodiment of the present invention. In FIG. 9, the same components as in the first embodiment shown in FIG. 4 are identified with the same reference numerals as in FIG. 4, and descriptions of the components will be omitted.

In the second embodiment, first to third LAN analyzers 13a to 13c, instead of the LAN analyzer of the first embodiment, are inserted between the transmission line 11 and the first to third computers 12a to 12c.

Figure 10:
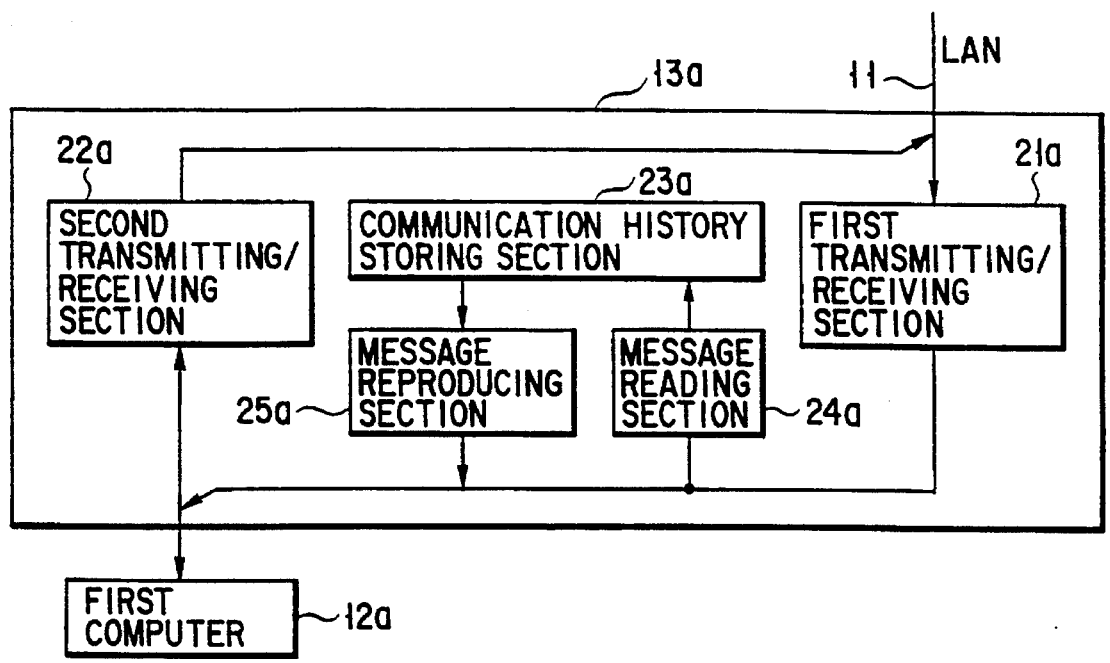
FIG. 10 is a block diagram showing a construction of a LAN analyzer according to second embodiment.

FIG. 10 is a detailed block diagram showing the first LAN analyzer 13a. Since the second and third LAN analyzers 13b and 13c are the same as the first LAN analyzer 13a, the drawings or descriptions thereof are omitted. As shown in FIG. 10, the first LAN analyzer 13a comprises a first transmitting/receiving section 21a for receiving a message from the transmission line 11 and transmitting it to the computer 12a; a second transmitting/receiving section 22a for receiving a message from the computer 12a and transmitting it to the transmission line 11; a communication history storing section 23a for storing messages; a message reading section 24a; and a message reproducing section 25a.

An operation of the second embodiment having the above structure will be described. In the following, only the first computer 12a and the first LAN analyzer 13a will be described.

The first computer 12a executes an operation shown in FIG. 6, in the same manner as in the first embodiment, in the first and second operation modes.

An operation of the first LAN analyzer 13a will be described below with reference to FIGS. 11 and 12.

Figure 11:
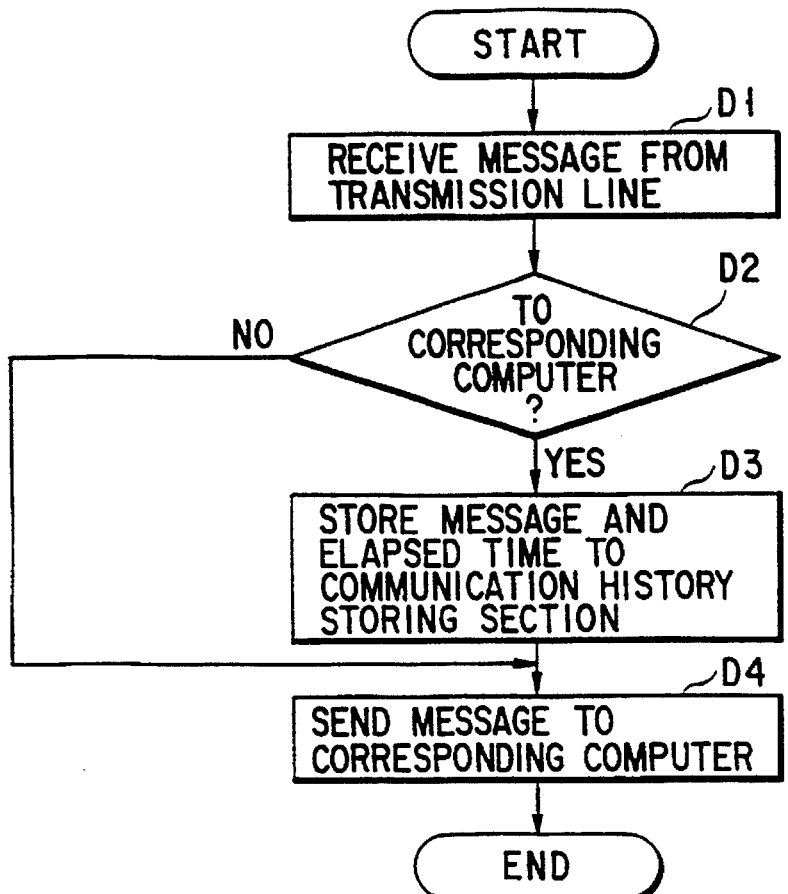
FIG. 11 is a flowchart showing an operation of a first LAN analyzer in a case where the first LAN analyzer receives a message through the transmission line.

FIG. 11 is a flowchart showing an operation of the first LAN analyzer 13a in a case where it receives a message from the transmission line 11.

When the first transmitting/receiving section 21a of the first LAN analyzer 13a receives a message from the transmission line 11 (step D1), it determines whether the message is addressed to the first computer 12a in charge of the first LAN analyzer itself (step D2). If it is determined that the message is address to the first computer 12a in the step D2, the message is read by the message reading section 24a and stored in the communication history storing section 23a, together with a period of time $\Delta t$, in the same manner as in the first embodiment as shown in FIG. 5 (step D3). The first transmitting/receiving section 21a transmits the message to the computer 12a (step D4).

Figure 12:
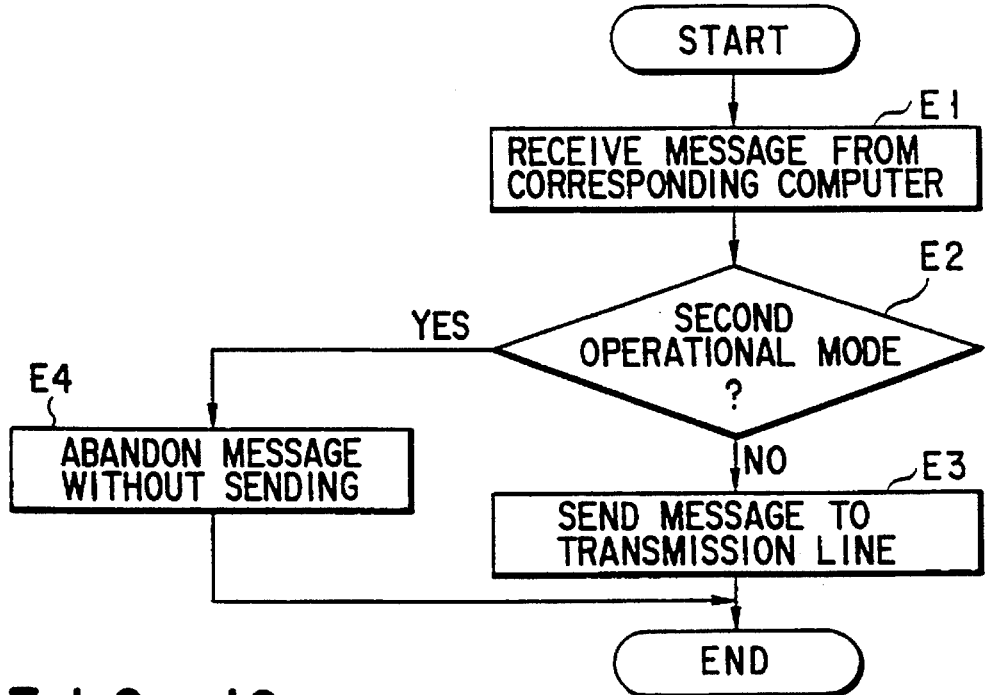
FIG. 12 is a flowchart showing an operation of a first LAN analyzer in a case where the first LAN analyzer receives a message from the first computer.

FIG. 12 is a flowchart showing an operation of the first LAN analyzer 13a in a case where it receives a message from the first computer 12a.

when the second transmitting/receiving section 22a receives a message from the first computer 12a (step E1), it determines whether the present operation is of the first operation mode or the second operation mode (step E2). If it is determined that the present operation is the first operation mode, the second transmitting/receiving section 22a sends the received message to the transmission line 11 (step E3).

In the step E2, if it is determined that the present sent operation is the second operation mode, messages addressed to the second and third computers 12b and 12c are sent from the communication history storing section 23a of the first LAN analyzer 13a to the second and third computers 12b and 12c. Hence, the second transmitting/receiving section 22a abandons the message received from the first computer 12a (step E4).

The second and third LAN analyzers 13b and 13c execute the above operation in the same manner as the first LAN analyzer 13a.

In the above-described computer system, the communication history storing sections 23a to 23c of the first to third LAN analyzers 13a to 13c respectively store not only messages addressed to the computers 12a to 12c of the messages which have been output to the transmission line 11 during an operation period based on a command to execute a normal operation, but also the periods of time $\Delta t$ elapsed since the immediately previous messages respectively addressed to the computers 12a to 12c.

In the second operation mode, the messages addressed to the first to third computers 12a to 12c, which are respectively stored in the communication history storing sections 23a to 23c, are transmitted to the corresponding computers 12a to 12c at time intervals $\Delta t$ respectively stored together with the messages. In the second operation mode, the messages from the first to third computers 12a to 12c are abandoned by the first to third LAN analyzers 13a to 13c corresponding to the first to third computers 12a to 12c.

Thus, according to the second embodiment, the communication history of the messages can be stored without an influence on a normal information process in the first operation mode, with the result that an operation can be replayed accurately.

In the above embodiments, the computers do not require a program only for use in replay processing, which incorporates a command to inhibit a message from being output. Therefore, the LAN analyzers 13a to 13c can be respectively provided to the first to third computers 12a to 12c, thereby forming a replay mechanism as an external device, without changing the process of the communication mechanisms in the computers.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system, comprising:

a transmission line of a LAN;

a plurality of computers connected to said transmission line; and a LAN analyzer connected to said transmission line, wherein said computer system has a first operation mode wherein said plurality of computers respectively execute a piece of information processing, while using at least one message passing through said transmission line, and a second operation mode for replaying the same operation corresponding to each message in the first operation mode, and wherein said LAN analyzer includes:

message reading means for reading each message which has been respectively output from each of said plurality of computers to said transmission line, in the first operation mode, communication history storing means for storing each message read by said message reading means and message generation time information related to the time of message generation as received by said LAN analyzer, in a time series manner, in the first operation mode, and message reproducing means for reading each message stored in said communication history storing means in the sequence in which each message was stored, and sequentially outputting each message to at least one of said plurality of computers on the basis of the message generation time information, in the second operation mode;

wherein said communication history storing means includes means for storing an elapsed time after receiving an immediately previous message as the message generation time information, and said message reproducing means includes means for outputting each message stored in said communication history storing means on the basis of the elapsed time.

2. The computer system according to claim 1, wherein said LAN analyzer further comprises message abandoning means for abandoning a message respectively output from each of said plurality of computers, in the second operation mode.

3. The computer system according to claim 1, wherein each of said plurality of computers comprises:

replay means for replaying the information processing in accordance with an output of said message reproducing means in the second operation mode; and message output prohibiting means for prohibiting a message from being output to said transmission line.

4. A computer system, comprising:

a transmission line of a LAN;

a plurality of computers operably connected to said transmission line; and a plurality of LAN analyzers connected between said transmission line and said plurality of computers, each of said plurality of LAN analyzers being respectively connected to at least one of said plurality of computers and to said transmission line, wherein said computer system has a first operation mode wherein said plurality of computers respectively execute a piece of information processing, while using at least one message passing through said transmission line, and a second operation mode for replaying the same operation corresponding to each message in the first operation mode, and wherein each of said plurality of LAN analyzers includes:

message reading means for reading each message which has been respectively output from at least one of said plurality of computers to said transmission line and whose destination is a computer connected to a corresponding LAN analyzer, in the first operation mode;

communication history storing means for storing each message read by said message reading means and message generation time information related to the time of message generation as received by a corresponding LAN analyzer, in a time series manner, in the first operation mode;

message reproducing means for reading each message stored in said communication history storing means in the sequence in which each message was stored, and sequentially outputting each message on the basis of the message generation time information to a corresponding computer, in the second operation mode; and message abandoning means for abandoning a message output from a computer connected to a corresponding LAN analyzer, in the second operation mode;

wherein said communication history storing means includes means for storing an elapsed time after receiving an immediately previous message as the message generation time information, and wherein the message reproducing means includes means for outputting each message on the basis of the elapsed time.

5. The computer system according to claim 4, wherein each of said plurality of computers comprises replay means for replaying the information processing in the second operation mode.

6. The computer system according to claim 4, wherein each of said plurality of computers comprises message output prohibiting means for prohibiting a message from being output to said transmission line.

7. A method of analyzing a communication procedure applied to a computer system in which a plurality of computers are connected to a transmission line of a LAN, said computer system having a first operation mode wherein said plurality of computers respectively execute a piece of information processing, while using at least one message passing through said transmission line and a second operation mode for replaying the same operation corresponding to each message in the first operation mode, the method comprising the steps of:

a first step of reading each message respectively output from said plurality of computers to said transmission line, each message including at least information on a sender computer and a destination computer, in the first operation mode;

a second step of storing each message read in said first step together with message generation time information corresponding to each message related to the time of message generation as received for said storing, in a time series manner;

a third step of sequentially outputting each message stored in said second step to at least one of said plurality of computers based on said message generation time information, in the second operation mode; and a fourth step of replaying the information processing in accordance with said third step and prohibiting at least one message from being output to the transmission line;

wherein said second step includes a step of storing an elapsed time since an immediately previous message as said message generation time information, and wherein said third step includes a step of outputting each message on the basis of the elapsed time.

* * * * *